J. A. EDEN, Jr.
MACHINE FOR MANUFACTURING LACING HOOKS.
APPLICATION FILED FEB. 17, 1908.
953,002.
Patented Mar. 22, 1910.
5 SHEETS—SHEET 1.
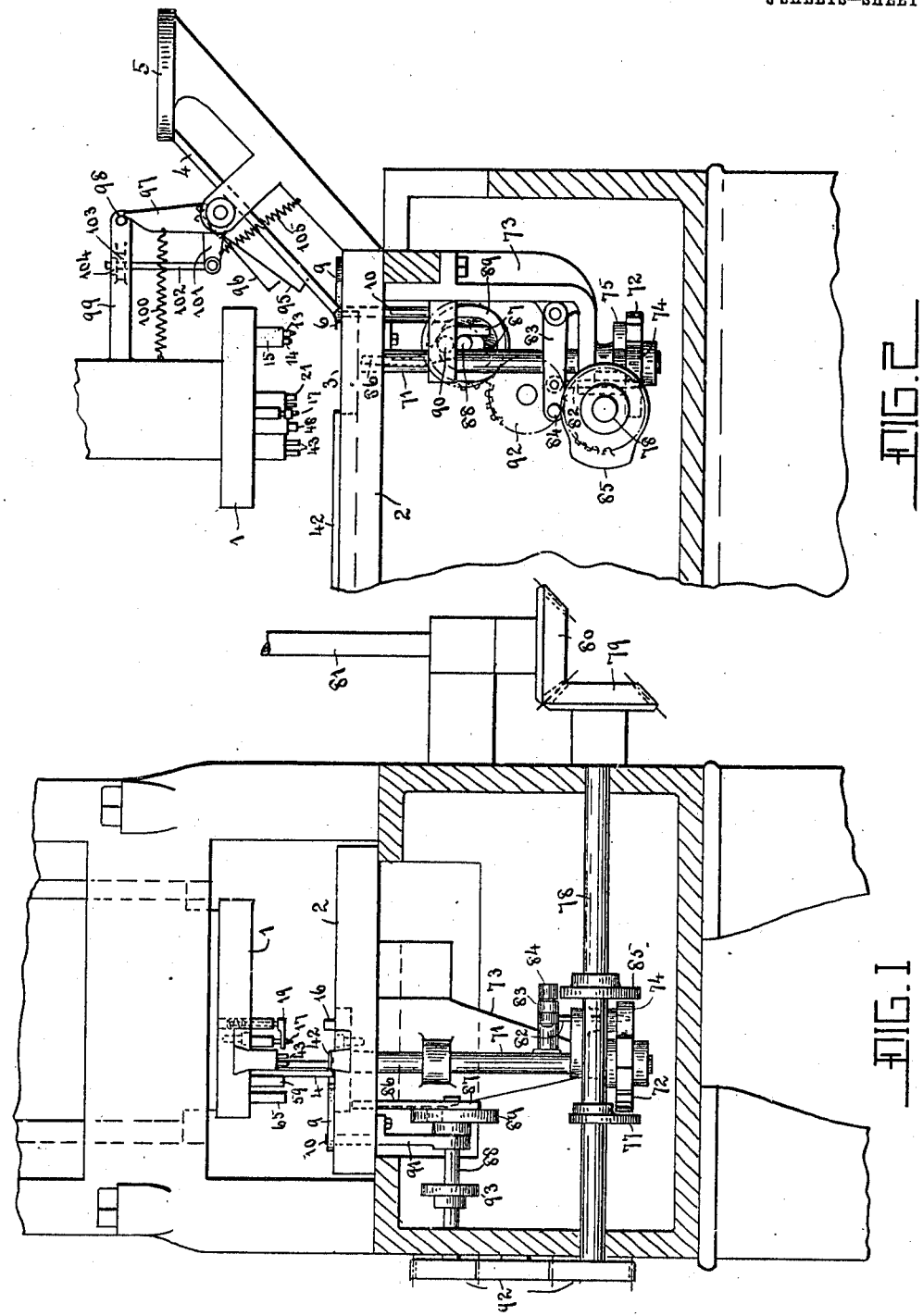
Witnesses
R. A. Smith.
M. E. Verbeck.
James A. Eden, Jr. Inventor
By his Attorney Eugene Diven

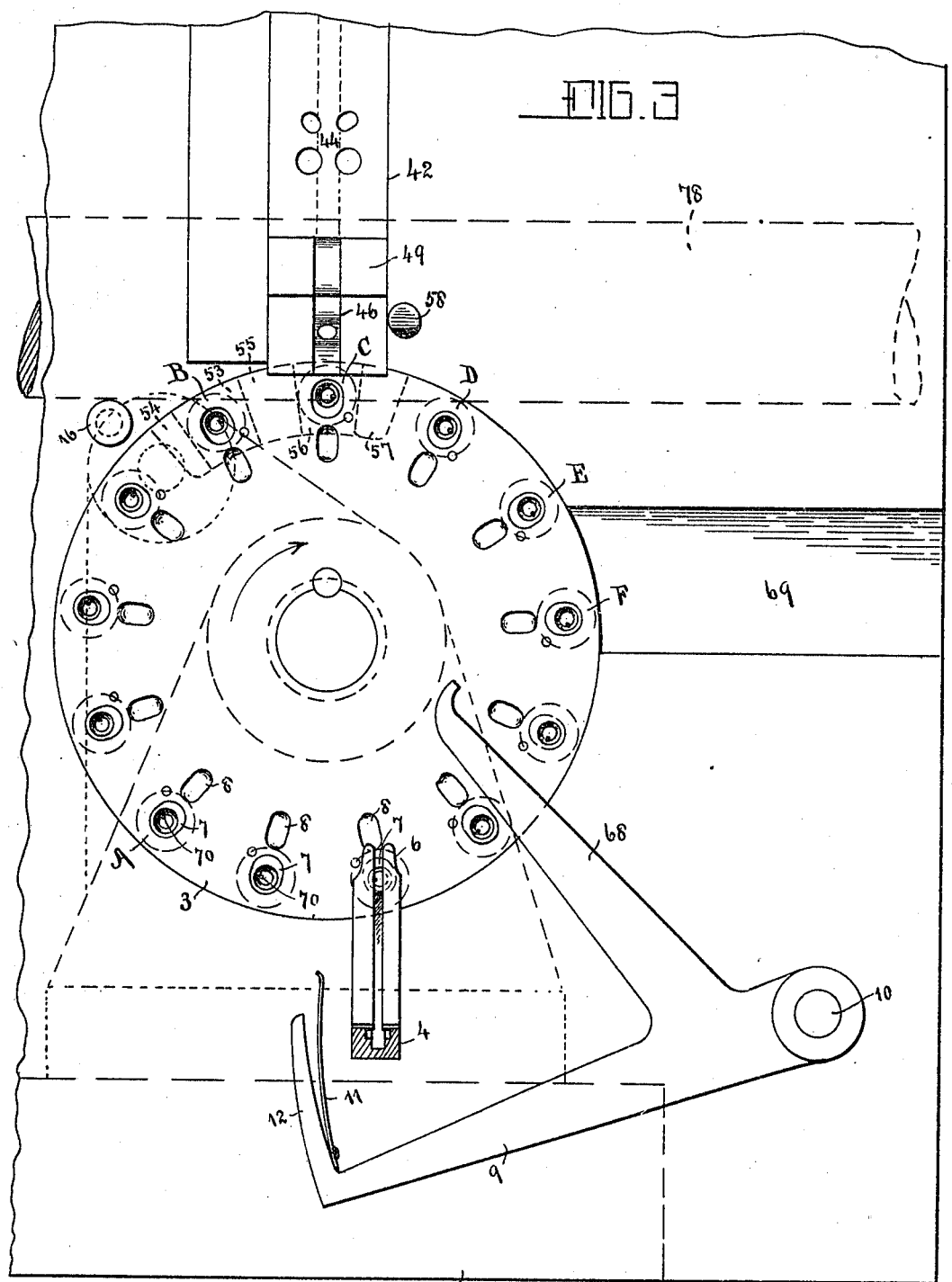

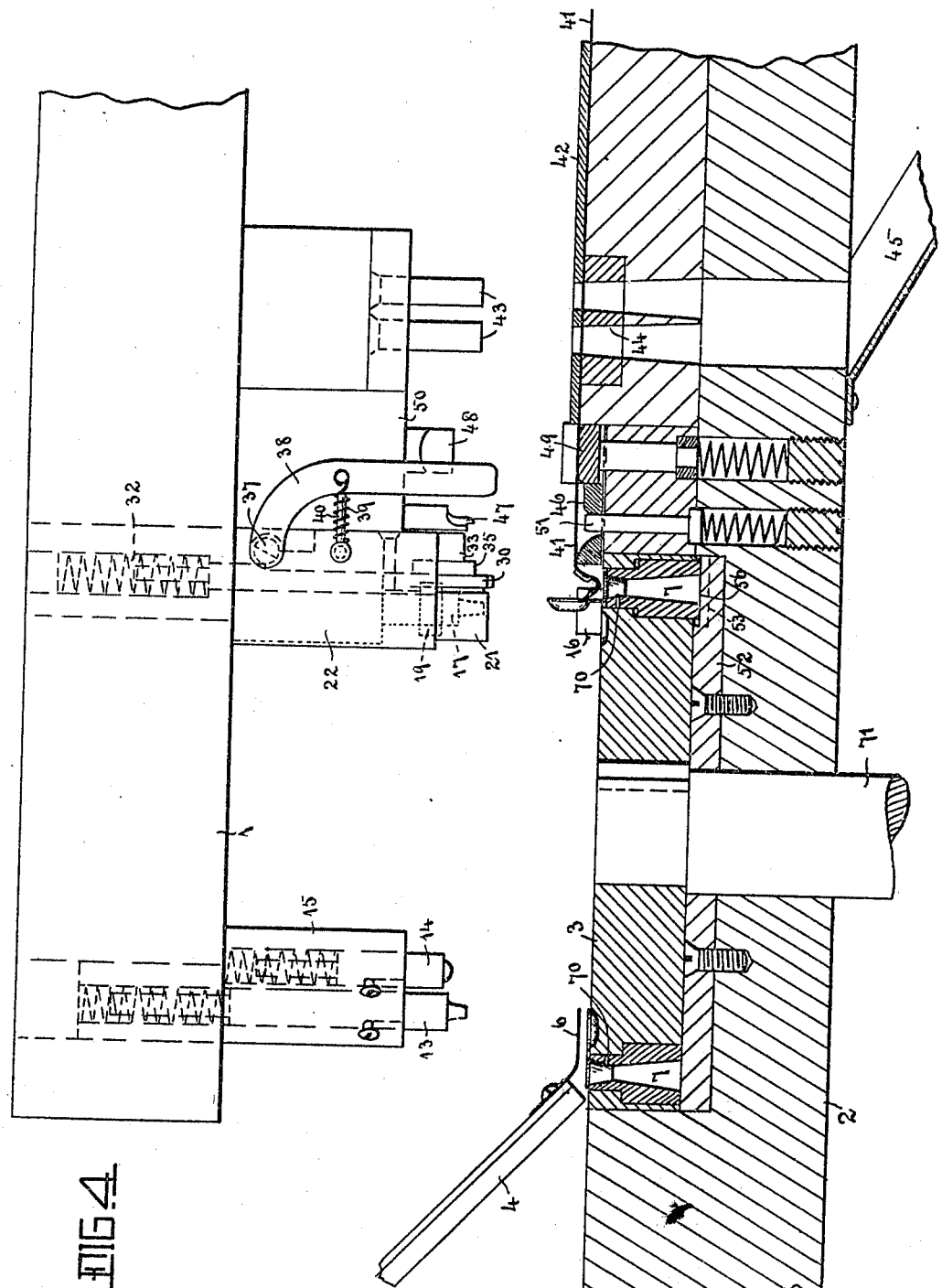

J. A. EDEN, Jr.
MACHINE FOR MANUFACTURING LACING HOOKS.
APPLICATION FILED FEB. 17, 1908.
953,002.
Patented Mar. 22, 1910.
5 SHEETS—SHEET 4.
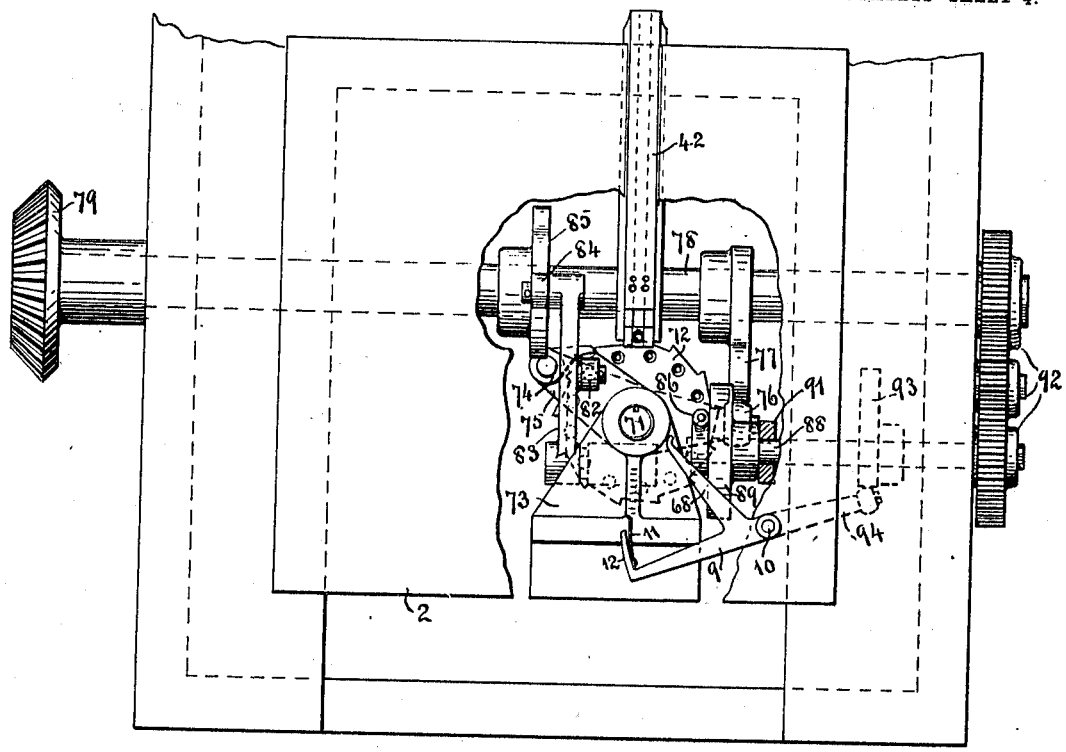
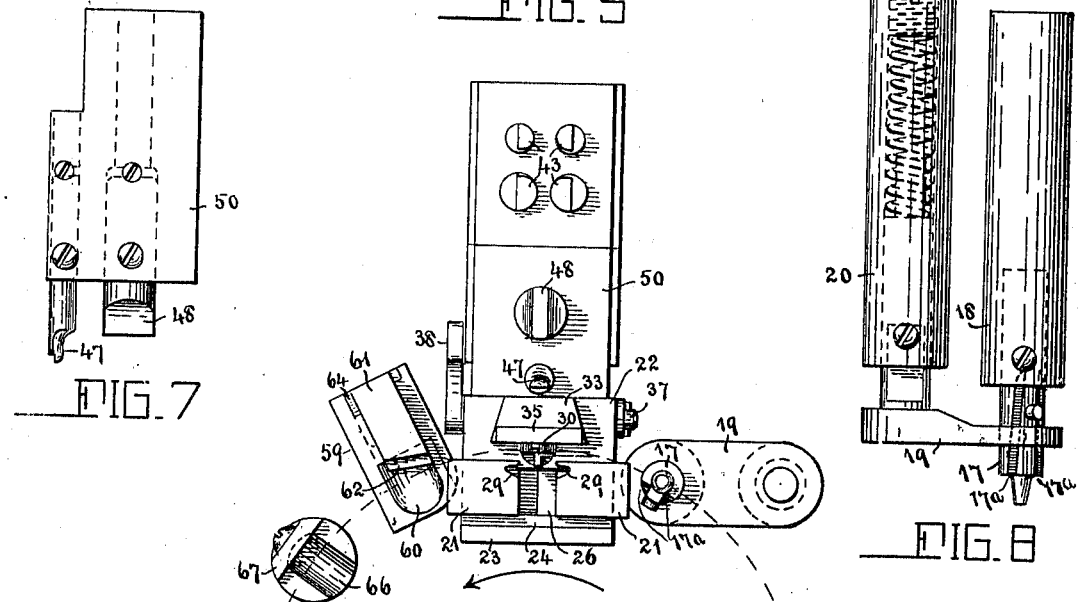
WITNESSES:
INVENTOR
BY
ATTORNEY J. A. EDEN, Jr.
MACHINE FOR MANUFACTURING LACING HOOKS.
APPLICATION FILED FEB. 17, 1908.

953,002.

Patented Mar. 22, 1910.
5 SHEETS—SHEET 5.

WITNESSES:
R. A. Smith.
M. E. Verbeck.

INVENTOR
James A. Eden, Jr.
BY
Eugene Tiven
ATTORNEY

UNITED STATES PATENT OFFICE.

JAMES A. EDEN, JR., OF BROOKLYN, NEW YORK, ASSIGNOR, BY MESNE ASSIGNMENTS, TO REES HOOK COMPANY, OF ELMIRA, NEW YORK.

MACHINE FOR MANUFACTURING LACING-HOOKS.

953,002. Specification of Letters Patent. Patented Mar. 22, 1910.

Application filed February 17, 1908. Serial No. 416,209.

*To all whom it may concern:*

Be it known that I, JAMES A. EDEN, Jr., a citizen of the United States, residing at Brooklyn, in the county of Kings and State of New York, have invented a new and useful Machine for Manufacturing Lacing-Hooks, of which the following is a specification.

This invention relates to improvements in machines for manufacturing lacing hooks such as are used upon shoes, leggings, and other articles of wearing apparel; and the object of my invention is to provide a machine which will be particularly adapted for automatically making the springs and fastening them in the lacing hooks described in U. S. Letters Patent to Fred H. Rees, No. 793,609, dated June 27, 1905.

For the purpose of carrying out my object, I employ a power press provided with dies and punches, whereby the springs are cut out and bent into shape from a narrow strip of annealed spring steel, as it is fed into the machine. At the same time, the hook blanks, previously formed and punched out by means of a punching press such as devised by me and described in Letters Patent No. 854,706, granted May 21st, 1907, are fed upon a dial and carried around by the intermittent rotation thereof, into position beneath various bending and assembling tools carried by the reciprocating tool holder attached to the cross head of the press. The springs are positioned in the hooks and fastened thereto, as the dial carries the hook blanks into position in line with the spring forming dies; the hooks being subsequently carried by the dial beneath heading over tools, and thereafter discharged from the machine.

I attain my object by arranging the machine and periodically operating the several parts thereof in the manner illustrated in the accompanying drawings, in which—

Figure 9:
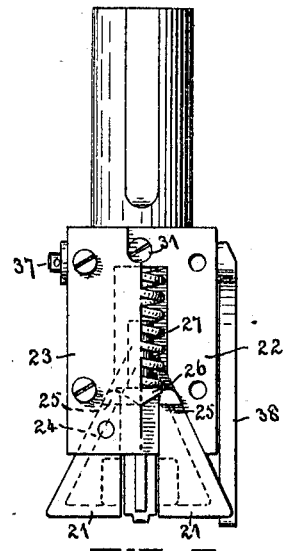
Figure 10:
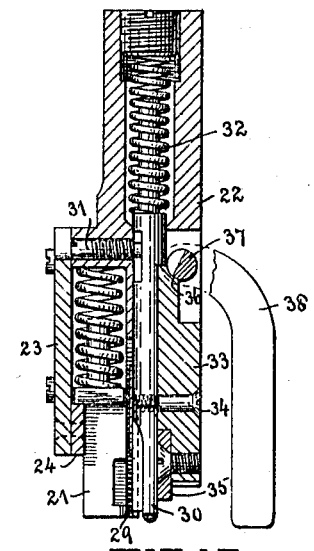
Figure 11:
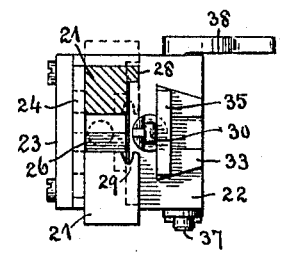
Figure 12:
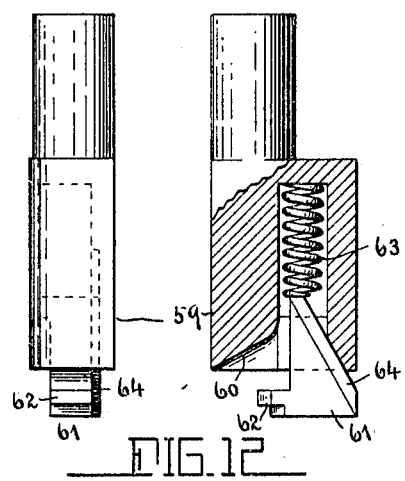
Figure 13:
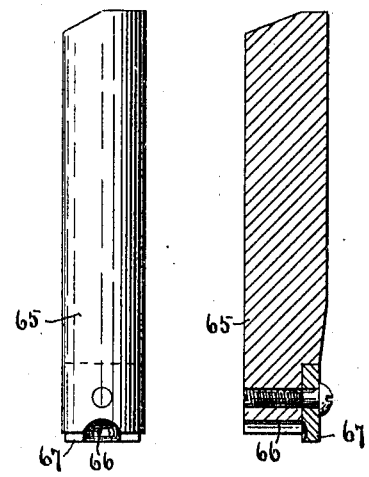
Figure 14:
Figure 15:
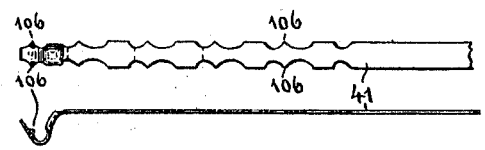
Figure 16:
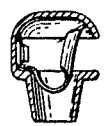

Figure 1 represents a portion of a power press as arranged to carry out my invention; Fig. 2, a sectional view at right angles to that shown in Fig. 1; Fig. 3, a plan view of a portion of the bolster plate of the press, showing the arrangement of the dial and coöperating parts; Fig. 4, a sectional view through the dial and the spring forming dies; the positioning, forming, and assembling tools being shown in position on the tool holder thereabove and in their retracted position; Fig. 5, a plan view showing the dial operating mechanism; Fig. 6, a view of the spring forming and hook bending tools, looking at them from below; Figs. 7 to 13, inclusive, full size details of the several tools carried by the tool holder; Fig. 14, a plan and side view of the hook blank as it is fed into the machine; Fig. 15, a plan and side view of the spring strip in its various stages, to the point where the spring is positioned in the hook; and Fig. 16, an enlarged sectional view of the hook, with the spring fastened therein.

Like numerals designate like parts in the several views.

In Fig. 1, I have shown my mechanisms as applied to a power press of ordinary type. A tool holder 1 adapted to carry the various tools and punches, which operate upon the spring strip and hook blanks during each reciprocation of the machine, is fastened to the cross-head above the bolster 2 mounted upon the bed of the machine. In this bolster is a dial 3, the upper face of which is flush with the top of the bolster. The hook blanks are fed to this dial by hand from a magazine 5, through the chute 4; the blanks being guided into position in the dies 7, carried by the dial, by spring lips 6, projecting from the end of the cover-plates of the chute. The dies 7 are so mounted in the dial as to permit them to have a slight vertical movement therein, but are held against turning movement; the upper portion of the dies, as herein shown, being made oblong, or elliptical, where they pass out through the upper portion of the dial. Opposite each die 7 is a pocket 8 shaped to receive the head of the hook; so that the hook blank will rest flat upon the upper surface of the dial, when in proper position thereon. To insure the proper positioning of the blanks, I provide a sweep-arm 9 on an oscillating shaft 10, operated by suitable mechanism below the bolster. The sweep-arm carries at its end a suitably shaped flat spring 11 fastened to a finger 12. After a blank has been deposited upon the dial, this sweep-arm is thrown inward and acts through the spring and finger, to so move the blank in the die that the head of the hook will lie directly above the adjacent pocket 8.

As the dial is intermittently rotated, each blank deposited in the dies is brought beneath the setting punches 13 and 14, carried by the tool holder at position A, in Fig. 3. The punch 13 forces the eyelet of the blank into the die 7, where it is engaged by a small pin 70, which prevents the subsequent turning of the blank in the die. At the same time the punch 14 presses the head of the blank into the pocket 8. The punches 13 and 14 are carried by the socket-piece 15, attached to the tool-holder, and are so mounted therein as to give slightly as they are pressed down upon the blanks. They are forced outwardly by springs, as indicated in Fig. 4.

From position A, the blanks are carried around to position B, where the head and back of the blank are bent upward at right angles, the blank at this point being acted upon by the bending punch 17, which forces the eyelet portion of the blank and also the die 7 downward for a short distance, thereby causing the back portion of the hook to be drawn into the die socket and to be turned upward with the head at right angles to the eyelet portion, the blank being thus bent into the form in which it is shown in Fig. 4. To permit of this depression of the dies, the fixed plate 52 below the dial is provided with a recess 53, into which an incline leads at 54, as indicated by broken lines in Fig. 3. A stripper 19 releases the blank from this punch on its upward stroke. The punch 17 is adjustably fastened in the socket-piece 18, and the stripper is carried upon a spring actuated rod having limited motion in the socket-piece 20. The stripper rests upon the stop 16 while the punch is performing its work in order that the stripper may not interfere with the upward bending of the head. The ears at each side of the back portion of the hook are turned inward by reason of the curve of the die socket, the punch being provided with two longitudinal grooves 17ª to give clearance for the ears, (see Figs. 6 and 8), when they are thus drawn down into the die socket.

Upon the next onward motion of the dial, the blank is carried to position C, and the die 7 is partially raised by riding up the incline indicated at 55 leading to a shallower recess 56 in plate 52; the parts being now in the position shown in Fig. 4, with the top of the eyelet portion of the blank flush with the top of the dial. At this point, the spring is positioned in the partially bent hook, and the ears at each side of the back portion of the hook blank are bent around and clenched against the fixed end of the spring, this bending of the ears being accomplished by means of the sliding jaws 21, mounted in the socket-piece 22. As the tool holder descends, these jaws rest upon the top of the dial and are forced upward into a chamber formed in the socket-piece, the side walls of which are inclined so as to force the jaws together, as they rise into the chamber. The curved notches 29 at the bottom of the jaws receive the ears, as the jaws descend, and bend them into clenching position as the jaws are forced together. Above these notches the jaws are recessed, as shown, to receive the head of the hook. As the tool holder rises, the jaws are thrown outward by the wedge-block 26, actuated by the spring 27; and are moved apart by the inclined tongues 28, which slide in corresponding grooves formed at the back of the chamber in the socket-piece. The outward travel of the jaws is limited by the lugs 25 at their inward ends contacting with the stop-plate 24, which is riveted to the inside of the cover-plate 23. The spring is positioned in the eyelet of the blank, for this assembling operation, by means of the punch 30, which is slidably mounted in the socket-piece 22 back of the clenching jaws; the outward and inward travel of said punch being limited by the screw-pin 31, which enters a notch in the stem of the punch. At its upper end, this punch stem is acted upon by the spring 32, the tension of which may be adjusted by the screw plug shown at the top of the socket-piece. Back of the punch 30, and fastened thereto, is a guide-block 33, dove-tailed into the back of the socket-piece 22, and fastened to a flattened portion of the stem of the punch 30 by means of the screw 34. At its lower end, this guide-block is provided with a shearing-plate 35, which acts in conjunction with the outer edge of the die 46, (see Fig. 4,) to cut the spring from the strip 41 just before the punch 30 contacts with the spring to press it into place in the eyelet. During this shearing operation, the guide-block 33 and the punch 30 are locked against upward motion in the socket-piece by means of a transverse lock-pin 37, one side of which, where it engages the guide-block 33, is partially cut away; so that there is a limited degree of engagement between the pin and the upper curved end of the guide-block at 36. The pin 37, at one side of the socket-piece, is provided with a curved lever-arm 38, which is held in its normal locking position by a spring 39 against a stop 40, which projects from the side of the socket-piece. The lower end of the lever-arm, when the tool holder descends, strikes upon the beveled post 58, (see Fig. 3) and is thereby thrown to the rear, or to the right in Fig. 4, sufficiently to cause the pin 37 to release the guide-block 33. This permits the punch 30, which now rests upon the spring in the eyelet, to rise in the socket-piece, as said socket-piece continues to descend to close the jaws against the hook blank. Upon the upward stroke of the tool holder, the spring 32 forces the punch and guide-block outward again, and, the lever 38 being released, the lock-pin 37 will be again turned into engagement with the upper end of the guide-block.

The spring strip 41 is fed to the punching and forming dies through a guide-way 42, by means of an automatic intermittent feed device of any well known form, attached to the rear of the machine, and not herein shown. As this strip is fed toward the dial, it is first operated upon by the four punches 43, which pass through openings in the cover-plate of the guide-way 42, and into corresponding openings in the die 44; the punchings from the strip dropping through the bolster and being discharged from the machine by way of the chute 45. When the strip is over the die 46, the spring forming punch 47 acts, in conjunction with said die, to bend the spring into the shape in which it is delivered to the hook-blank, as shown more fully at the left-hand end of the strip, in Fig. 15. The point of severance between the spring blanks is indicated in said figure by broken lines. To release the spring from the die 46, a spring actuated knock-out 51 is provided in the bolster; and during the spring forming operation, the spring strip is held in position between the holding tool 48 and the spring actuated block 49. The punch 47 and holder 48 are carried in a socket-piece 50, and means is provided therein for setting them in their proper vertical adjustments.

From the position C the hook blanks, which now have the spring fastened therein, are carried by the dial into position D, the dies 7 being pushed up into their normal position by an incline 57, (see Fig. 3,) which leads from the recess 56 to the upper surface of plate 52. In position D, the head of the hook blank is operated upon by the first turnover punch 59. This punch is provided on its lower side with an inclined groove 60, (see Figs. 6 and 12,) which contacts with the outer end of the head of the blank and turns it over above the spring. During this turning over of the head, the tongue of the spring is pressed inward by the slide block 61, mounted in a chamber formed at one side of the punch block. This slide block is provided at its outer end with a projection 62, which engages the tongue of the spring and presses it back into position in the hook, as the punch descends, the slide block resting upon the dial during the operation, and being forced forward into the hook by its inclined engagement with the rear of the chamber in the punch block. This projection 62 also prevents the head from being bent over too far. As the tool holder rises, the slide block is pressed outward and away from the hook by spring 63 and the inclined tongue 64. The blanks are next carried by the dial to position E, where the final turnover operation is performed. At this position the head of the hook is acted upon by the punch 65, (see Figs. 6 and 13,) the lower end of which is provided with a horizontal groove 66, terminated by a vertical plate 67. This plate 67 is provided with a transverse groove which receives the outer end of the head of the hook, to prevent the head from being bent over beyond the eyelet. This second turnover tool acts to properly locate and space the head of the hook with reference to the eyelet. The hook is now in its finished condition, so far as the operations upon it by this machine are concerned, and as the dial carries it into the position F, a branch 68 from the sweep-arm 9 throws the finished hook from the dial into the discharge chute 69; the eyelet of the hook being pushed out of the die by means of a knock-out bar 86, (see Figs, 1, 2, and 5,) which is projected upward through the dies, when this position is reached.

The operating mechanism for the dial, sweep-arm, and knock-out is located below the bolster 2 in the bed of the press; said bed being chambered out as shown in Figs. 1 and 2, to receive this mechanism. The dial is mounted upon the end of a vertical shaft 71, carried by the bracket 73, attached to the lower side of the bolster; and is actuated by the ratchet wheel 72, fastened to the lower end thereof, and rotated by pawl 74, pivoted upon the end of the arm 75, which is loosely mounted upon the shaft 71 above the ratchet wheel. This ratchet arm at its other extremity, is provided with a roller 76, which is engaged by a cam 77 upon the shaft 78. This shaft passes through the bed of the press, and is rotated by the bevel gears 79 and 80, the latter gear being driven by a shaft 81 connected with the crank shaft at the head of the press. The shaft 78 rotates once to each reciprocation of the tool holder; thereby advancing the ratchet wheel 72 one tooth, and the dial 3 one die. To lock the dial in each of its positions, I provide a locking-pin 82, which drops into conical holes in the ratchet wheel. This locking-pin passes through a guide carried by the bracket 73, and is coupled at its upper end to a lifting bar 83, one end of which turns upon a pin projecting from the bracket. The outer end of this bar is provided with a roller 84, which rides upon a cam 85 on the shaft 78; said cam being so formed as to throw the latch bar upward and out of engagement with the ratchet wheel when the pawl is actuated by the cam 77 to rotate the wheel.

The knockout bar 86 is actuated by a cam 89, upon a supplemental shaft 88. The lower end of this knockout bar is forked at 87 to straddle the end of the shaft 88 and is provided at 90, (see Fig. 2,) with a pin or roller which engages a cam groove formed in the cam wheel 89. The shaft 88 is supported by the hanger 91, at one end, and at the other end passes out through the bed of the press, where it is geared to the shaft 78 by the gear train 92.

The shaft 10, which actuates the sweep-arm 9, is oscillated at the proper periods by means of a cam 93, (see Figs. 1 and 5,) on the shaft 88, which acts upon the arm 94 fastened to said shaft below the bolster.

In feeding the hook blanks to the machine, they are placed by hand in the chute 4 with the head end downward; so that they pass from the chute upon the dial head first; and they are automatically fed to the dial by means of the oscillating arms 95 and 96. Needles carried by these arms engage the eyelets of the hook blanks, and the two needles are positioned a distance apart equal to the length of one of the blanks. As shown in Fig. 2, the needle arm 95 is in position to engage a blank, thereby holding back all the blanks above the one so engaged. As the tool holder descends, this needle arm is thrown outward, to release a blank, by means of the rock arm 97, to which the needle arm is fastened. This rock arm is acted upon by the pin 98 on the bracket 99 attached to the cross head of the press. The upper end of the arm 97 is cam shaped, so that the pin 98, in descending, will throw the arm 97 outward at the proper period to release the needle from the blank. As the needle arm 95 is being thrown outward, the needle arm 96 will be thrown inward, to engage the next following hook blank, by means of the rock arm 101, to which it is attached and which is drawn downward by a spring 105. Upon the upstroke of the cross head, the rod 102 coupled to the arm 101 and passing through a boss 103 on the bracket 99, will be carried upward by reason of the engagement of a nut 104, on the upper end of said bar, with said boss, thereby raising the needle arm 96, and permitting the blanks to descend in the chute. At the same time, the arm 97 will be released by the raising of the pin 98 and drawn inward by the spring 100, thereby throwing needle arm 95 again into the chute, in time to engage the next hook blank as it descends therethrough.

Having thus described the several parts of my machine, and their individual action upon the hook blanks and the spring strip, during each reciprocation of the tool holder, it is believed that the complete operation of the machine will be fully understood without further description.

For properly positioning and retaining the springs in the hooks, I form the spring blanks with the projections 106, (see Fig. 15,) which rest upon the top of the eyelet and lie between it and the gripping ears on the back of the hook, acting in conjunction with said ears to hold the spring in place. After leaving the machine, the hooks will be treated to processes whereby the temper will be restored to the springs, and a suitable color or coating imparted to the hooks to correspond with shoes, etc., to which they are to be applied.

What I claim as my invention and desire to secure by Letters Patent is:—

1. A machine comprising a series of hook bending tools in combination with means for automatically assembling and fastening a spring of the character described in a hook.

2. A machine comprising a series of hook bending tools in combination with means for cutting out and bending into shape a spring of the character described, and means for assembling and fastening said spring in a hook.

3. The combination, with a set of reciprocating punches and stationary dies adapted to cut and bend into shape a spring of the character described, of a series of hook bending tools reciprocating in unison with said punches, means for transferring a hook blank from one tool to the next, and means at one point in the travel of the hook blank for delivering a spring to the hook blank and fastening it therein.

4. The combination, with a set of reciprocating punches and stationary dies adapted to cut and bend into shape a spring of the character described, of a series of hook bending tools reciprocating in unison with said punches, a series of intermittently movable dies adapted to receive the hook blanks and to transfer them from one tool to the next at each reciprocation of said tools, and means at one point in the travel of the hook blanks for delivering the springs to the blanks and fastening them therein.

5. The combination, with a set of reciprocating punches and stationary dies adapted to cut and bend into shape a spring of the character described, of a series of hook bending tools set in a circle and reciprocating in unison with said punches, a dial carrying a plurality of dies set in a corresponding circle below said tools and adapted to receive the hook blanks, means for imparting a partial rotation to the dial at each reciprocation of the tools to position the dies in turn beneath each tool, means for depositing and positioning the hook blanks in the dies upon the dial, and means for delivering a spring to a hook blank and fastening it therein as the blanks are carried into position by the dial opposite the spring dies.

6. The combination, with a dial carrying a plurality of dies set in a circle thereon and each adapted to receive the eyelet of a hook blank, of means for imparting an intermittent rotation to the dial, means at one side of the dial for delivering a hook blank to a die at each pause of the dial, a series of tools carried by a reciprocating tool holder in a corresponding circle above the dies, said tools acting at each pause of the dial, first to press the blanks into place in the dies, second, in conjunction with the dies, to upset the head and back of the blanks, third, to position and fasten a spring in the blanks, and fourth, to turn over the heads of the blanks into position above the eyelets, and means for discharging the finished hooks from the dial.

7. The combination, with a set of reciprocating punches and stationary dies adapted to cut and bend into shape a spring of the character described from a strip of metal, of means for positioning a hook blank having an upset head and back portion opposite the bending die, means for cutting the spring from the strip and positioning it over the eyelet of the hook blank, and a tool reciprocating with the punches provided with jaws adapted to bend ears projecting from the back of the blank into engagement with the spring to fasten it in the hook.

8. The combination, with a set of reciprocating punches and stationary dies adapted to cut and bend into shape a spring of the character described from a strip of metal, and means for positioning a hook blank having an upset head and back portion opposite the bending die, of a cut-off and assembling tool reciprocating with said punches and comprising a socket piece, a guide block mounted to slide therein, a shearing blade carried by said block in position to register with a cutting edge provided at the end of the bending die, a punch attached to the block and adapted to insert and hold the spring when cut off in position in the hook blank, a pair of jaws slidably mounted in the socket piece and adapted to be brought together as the socket piece descends, means on said jaws for bending ears projecting from the back of the hook blank into engagement with the spring, means for locking the guide block during the cutting off operation, means for releasing the block thereafter to permit the punch to rise in the socket piece while the jaws are operating, and means for returning the jaws and guide block to their outward positions when the socket piece is withdrawn.

9. The spring fastening tool comprising a socket piece having a chamber provided with inclined side walls, a pair of triangular jaws adapted to slide in said chamber and project therefrom, means for projecting the jaws from the socket piece to a limited extent and separting them when so projected, said jaws being chambered to receive the head of a hook blank and being provided on their outer ends with means for bending cars on the back of the blank into engagement with a spring inserted therein.

10. A dial adapted to be intermittently rotated and provided with a plurality of vertically movable dies arranged in a circle thereon, said dies being adapted to receive the eyelets of previously formed hook blanks, in combination with means for fastening the blanks in position in the dies, a set of reciprocating bending tools arranged in a corresponding circle above the dies, one of the said tools being adapted to depress the dies to upset the head and back portions of the blanks and one or more of said tools being adapted to turn the heads of the blanks over into position above the eyelets, and means for maintaining the dies in normal position except at the point of depression.

In testimony whereof I have affixed my signature, in presence of two witnesses.

JAMES A. EDEN, Jr.

Witnesses:
CHARLES EDWIN POLLARD,
WILLIAM RILEY.